United States Patent
Morris et al.

(10) Patent No.: US 9,715,035 B2
(45) Date of Patent: Jul. 25, 2017

(54) PULSE NEUTRON FORMATION GAS IDENTIFICATION WITH LWD MEASUREMENTS

(75) Inventors: Charles W. Morris, The Woodlands, TX (US); Jeffrey Grant, Sugar Land, TX (US); Aron Kramer, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 239 days.

(21) Appl. No.: 13/698,615

(22) PCT Filed: May 19, 2011

(86) PCT No.: PCT/US2011/037185
§ 371 (c)(1),
(2), (4) Date: May 22, 2013

(87) PCT Pub. No.: WO2011/146734
PCT Pub. Date: Nov. 24, 2011

(65) Prior Publication Data
US 2013/0234012 A1    Sep. 12, 2013

Related U.S. Application Data

(60) Provisional application No. 61/346,312, filed on May 19, 2010.

(51) Int. Cl.
*G01V 5/10* (2006.01)
(52) U.S. Cl.
CPC .................................. *G01V 5/101* (2013.01)

(58) Field of Classification Search
CPC ........ G01V 5/101; G01V 5/102; G01V 5/104; G01V 5/125; G01V 5/107; G01V 5/145
(Continued)

(56) References Cited

U.S. PATENT DOCUMENTS 3,780,302 A * 12/1973 Arnold ................... G01V 5/102
250/269.6
3,925,659 A * 12/1975 Paap ....................... G01V 5/102
250/269.6
(Continued)

FOREIGN PATENT DOCUMENTS

EP    2101198 A1 *  9/2009

OTHER PUBLICATIONS

Odom, R. C. et al., Applications and Derivation of a New Cased-hole Density Porosity in Shaly Sands, 1997, Society of Petroleum Engineers. SPE-38699-MS, pp. 475-487.*
(Continued)

*Primary Examiner* — David J Makiya
*Assistant Examiner* — Taeho Jo

(57) ABSTRACT

Systems, methods, and devices for quantitatively identifying gas zones irrespective of porosity or lithology using nuclear downhole tools are provided. In particular, because some formation materials such as shales can confound some conventional measurements, a gas detection measurement may be obtained that can be used to qualitatively identify gas zones. The gas detection measurement may be based at least partly on a relationship between inelastic gamma rays, neutron capture gamma rays, and experimental or modeled formation data, such that the gas detection measurement qualitatively indicates a gas zone when a gas zone is present in a formation irrespective of a lithology or a porosity of the formation.

24 Claims, 7 Drawing Sheets

(58) Field of Classification Search
USPC .............................. 250/269.6, 390.11; 702/8
See application file for complete search history.

(56) References Cited

U.S. PATENT DOCUMENTS

| | | | | |
|---|---|---|---|---|
| 4,055,763 A * | 10/1977 | Antkiw | ................ | G01V 5/102 250/252.1 |
| 4,645,926 A * | 2/1987 | Randall | ................ | G01V 5/104 250/256 |
| 4,703,427 A * | 10/1987 | Catala | ................ | G01V 1/50 181/105 |
| 4,760,252 A * | 7/1988 | Albats | ................ | G01V 5/04 250/266 |
| 4,937,446 A * | 6/1990 | McKeon | ................ | G01V 5/104 250/265 |
| 5,473,939 A * | 12/1995 | Leder | ................ | E21B 23/06 166/264 |
| 5,539,225 A * | 7/1996 | Loomis | ................ | G01V 5/101 250/254 |
| 6,150,655 A * | 11/2000 | Odom | ................ | G01V 5/101 250/269.6 |
| 6,207,953 B1* | 3/2001 | Wilson | ................ | G01V 5/104 250/269.4 |
| 6,272,434 B1* | 8/2001 | Wisler | ................ | E21B 7/068 702/11 |
| 6,376,838 B1* | 4/2002 | Odom | ................ | G01V 5/101 250/269.6 |
| 7,117,092 B2 | 10/2006 | Jacobson | | |
| 2002/0130268 A1* | 9/2002 | Odom et al. | ............. | 250/390.11 |
| 2004/0034474 A1* | 2/2004 | Herron | ................ | G01V 1/306 702/6 |
| 2005/0067563 A1* | 3/2005 | Gilchrist | ................ | G01V 5/102 250/269.7 |
| 2006/0290350 A1* | 12/2006 | Hursan | ................ | G01N 24/08 324/303 |
| 2007/0023624 A1* | 2/2007 | Trcka | ................ | G01V 5/101 250/269.6 |
| 2007/0023625 A1* | 2/2007 | Trcka | ................ | G01V 5/101 250/269.6 |
| 2007/0241275 A1* | 10/2007 | Guo | ................ | G01V 5/101 250/269.1 |
| 2007/0246649 A1* | 10/2007 | Jacobi | ................ | G01V 5/12 250/269.6 |
| 2008/0023629 A1* | 1/2008 | Herron | ................ | G01V 5/125 250/269.6 |
| 2008/0179509 A1* | 7/2008 | Jacobi | ................ | G01V 5/104 250/269.2 |
| 2008/0179510 A1* | 7/2008 | Jacobi | ................ | G01V 5/104 250/269.6 |
| 2010/0228483 A1* | 9/2010 | LeCompte | ............. | G01V 5/101 702/8 |
| 2010/0228485 A1* | 9/2010 | Betancourt | ............ | G01V 11/00 702/13 |
| 2010/0292927 A1* | 11/2010 | Jacobson | ................ | G01V 5/00 702/8 |
| 2011/0198488 A1* | 8/2011 | Stoller | ................ | G01V 5/102 250/258 |
| 2011/0282818 A1* | 11/2011 | Chen | ................ | G01V 5/125 706/21 |
| 2011/0303836 A1* | 12/2011 | Gibson | ................ | G01V 5/04 250/267 |
| 2011/0313668 A1* | 12/2011 | Thornton | ............... | G01V 5/107 702/8 |
| 2012/0016588 A1* | 1/2012 | Evans | ................ | G01V 5/104 702/8 |
| 2012/0091329 A1* | 4/2012 | Chace | ................ | G01V 5/04 250/269.7 |
| 2012/0197529 A1* | 8/2012 | Stephenson | ............ | G01V 5/101 702/8 |

OTHER PUBLICATIONS

International Search Report for PCT Application Serial No. PCT/US2011/037185 dated Feb. 9, 2012.

* cited by examiner

PULSE NEUTRON FORMATION GAS IDENTIFICATION WITH LWD MEASUREMENTS

RELATED APPLICATIONS

This application claims the benefit of U.S. Provisional Application No. 61/346,312, which is assigned to Schlumberger Technology Corporation and entitled "PULSE NEUTRON FORMATION GAS IDENTIFICATION WITH LWD MEASUREMENTS" and filed on May 19, 2010, which is incorporated by reference herein in its entirety.

BACKGROUND

The present disclosure relates generally to nuclear well logging and, more particularly, to techniques for identifying gas in certain formations, such as shaly sands.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Nuclear downhole tools are frequently used in the oilfield to determine the properties of a subterranean formation. The valuable information gathered by nuclear downhole tools may indicate, for example, the location and concentration of hydrocarbons such as oil and gas, as well as other properties such as the density or porosity of the subterranean formation. In general, nuclear downhole tools operate by emitting some form of nuclear radiation (e.g., neutrons or gamma rays) into the formation surrounding a borehole. The emitted nuclear radiation interacts with the elements of the formation, the results of which can be detected by nuclear radiation detectors (e.g., neutron detectors or gamma ray detectors) in the downhole tool. Properties of the subterranean formation can then be determined based on the amount and type of radiation detected by the nuclear downhole tool.

Nuclear downhole tools are generally classified as wireline tools or logging-while-drilling (LWD) tools. Wireline tools may be lowered into a borehole to obtain measurements after the borehole has been drilled and/or cased with a casing. Thus, at the time of measurement, materials other than the formation itself may obscure the measurements of the downhole tool. For example, by the time a wireline tool obtains measurements of a subterranean formation, the borehole and surrounding formation may have become invaded by drilling fluid or by hydrocarbons. On the other hand, LWD tools may obtain measurements of the subterranean formation in an openhole reading at the time the borehole is initially being drilled. Since LWD tools take measurements of the formation at the time the borehole is being drilled, fewer materials other than the subterranean formation affect the measurement.

Both wireline and LWD nuclear downhole tools that perform pulse neutron capture (PNC) measurements have been developed. In general, PNC measurements involve emitting pulses of neutrons into the surrounding formation to be "captured" by the nuclei of elements of the formation. When the nuclei capture the neutrons, they emit gamma rays as a result. By measuring the extent to which these capture gamma rays are detected by radiation detectors in the downhole tool, a "capture cross-section" of the formation can be obtained. The capture cross-section of the formation is also referred to as the sigma measurement, and is used to discriminate between hydrocarbons and saline water in the subterranean formation, since chlorine in the salt water has a very large capture cross-section compared to hydrocarbons and reservoir rocks. The greater the total salt count (NaCl per 1,000 ppm) in the water contained by the subterranean formation, the better a PNC tool may quantitatively describe the water saturation.

In certain formations such as shale, sandstone, dolomite, and/or carbonate, however, the sigma measurement may not always accurately indicate certain formation properties. In fact, many large reserves of hydrocarbons in the Gulf of Mexico and elsewhere may have many zones of with significant amounts of shale and other similar rocks. It is believed that some prospects in these reserves apparently looked qualitatively marginal, or even bad, due to the effects of excess shale on PNC measurements. Many of these zones therefore may have been passed up indefinitely or, worse yet, condemned as non-productive.

SUMMARY

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

In one embodiment, a method includes emitting neutrons into a subterranean formation using a neutron generator. This causes inelastic scattering events that generate inelastic gamma rays and neutron capture events that generate neutron capture gamma rays. The resulting inelastic gamma rays and neutron capture gamma rays may be detected using a gamma ray detector. Data processing circuitry then may be used to determine a gas detection measurement based at least in part on a relationship between the inelastic gamma rays, the neutron capture gamma rays, and experimental or modeled formation data. The gas detection measurement may qualitatively indicate a gas zone when the gas zone is present in the subterranean formation, irrespective of a lithology or a porosity of the subterranean formation.

In another embodiment, a downhole tool includes an electronic neutron generator, a gamma ray detector, and data processing circuitry. The electronic neutron generator may emit a burst of neutrons into materials surrounding the downhole tool to cause inelastic scattering events that produce inelastic gamma rays and neutron capture events that produce neutron capture gamma rays. The gamma ray detector may detect the inelastic gamma rays and the neutron capture gamma rays, and the data processing circuitry may use these detected gamma rays to determine a qualitative gas detection measurement. This qualitative gas detection measurement may provide an accurate qualitative indication of the presence of a gas zone in a subterranean formation near the downhole tool even when a conventional measurement suggests otherwise.

In another embodiment, a system may include a downhole tool and data processing circuitry. The downhole tool may emit neutrons into a subterranean formation and detect the inelastic gamma rays and neutron capture gamma rays that result. The data processing circuitry may determine several gas detection measurements based at least in part on a relationship between the inelastic gamma rays, the neutron capture gamma rays, and experimental or modeled formation data, or both. The data processing circuitry may plot the plurality of gas detection measurements as a gas detection measurement diagnostic curve in a well log, such that a deflection over a threshold in the gas detection measurement diagnostic curve qualitatively suggests a gas zone when the gas zone is present in the subterranean formation, irrespective of a lithology or a porosity of the subterranean formation.

In another embodiment, an article of manufacture includes one or more tangible, machine-readable media at least collectively comprising processor-executable instructions. These instructions may include, for example, instructions to receive a count rate of inelastic gamma rays and neutron capture gamma rays detected by a pulsed neutron capture tool at some depth in a formation. From these count rates, other instructions may determine a gas detection measurement that accurately indicates the presence of a gas zone in shale, sandstone, dolomite, and/or carbonate. The gas detection measurement may be determined based at least in part on a function taking the count rate of inelastic gamma rays and the count rate of neutron capture gamma rays as variables.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
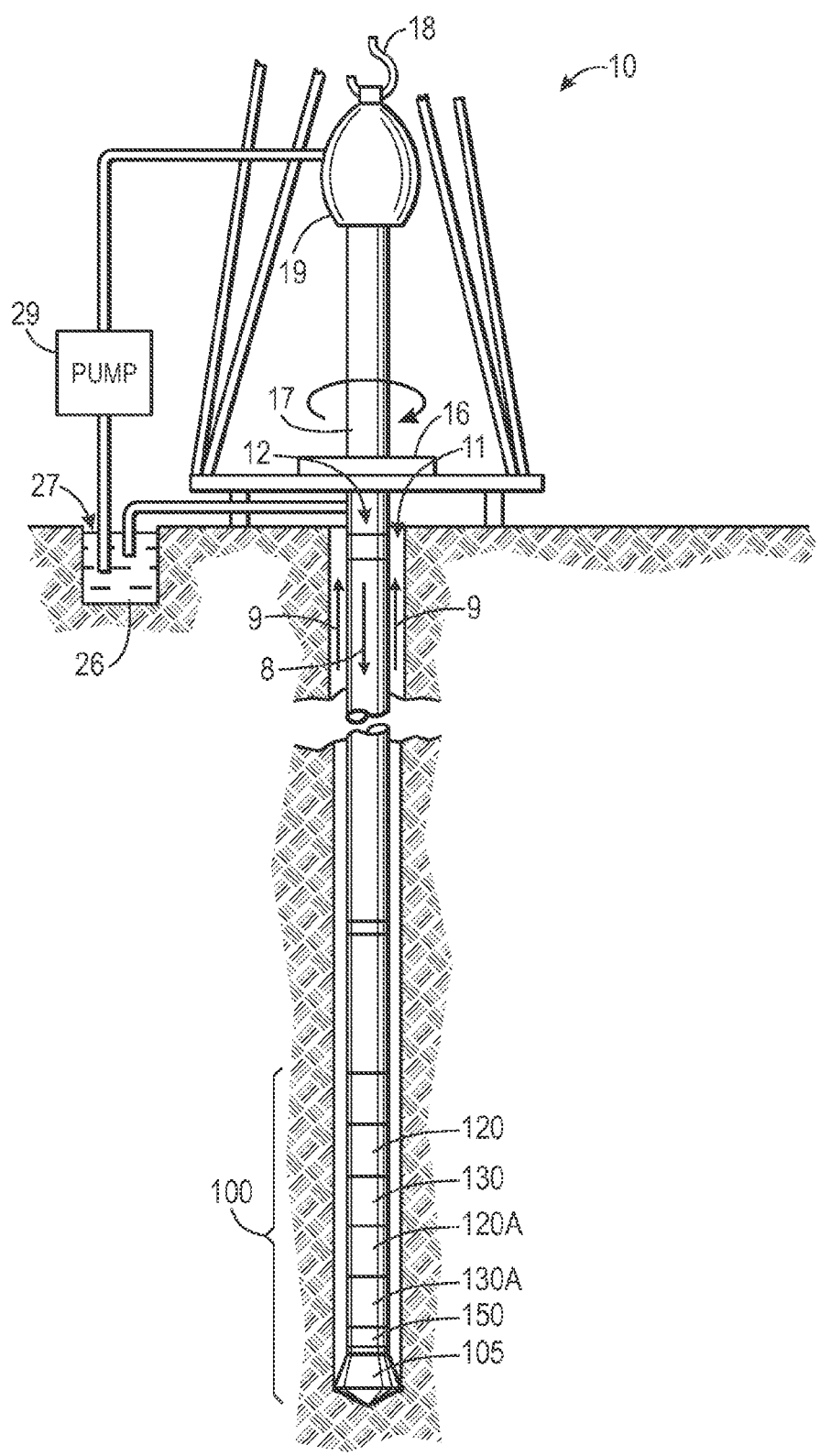
FIG. 1 is a schematic diagram of a wellsite system employing a qualitative gas detection measurement system, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments relate to well-logging systems and methods for identifying gas zones in a subterranean formation largely irrespective of the lithology or porosity of the formation. Thus, according to present embodiments, gas zones may be detected despite the presence of shale, sandstone, dolomite, and/or carbonate, for example, which might otherwise obscure the detection of gas. For example, a pulsed neutron capture (PNC) tool according to embodiments may emit pulses of fast, high-energy neutrons and detect the gamma rays that result. When the fast, high-energy neutrons interact with the materials surrounding the downhole tool, inelastic scattering events may produce inelastic gamma rays and neutron capture events may produce neutron capture gamma rays. Counts of both of these types of gamma rays may be used to identify gas zones according to the present disclosure.

That is, rather than relying only on the neutron capture gamma rays that are used to calculate the capture cross-section of the formation, or sigma, a qualitative gas detection measurement $Gas_{ID}$ may be determined from both inelastic gamma rays and neutron capture gamma rays. As discussed below, this gas detection measurement $Gas_{ID}$ may be any suitable function (e.g., a polynomial function) that correlates inelastic gamma ray count rates as well as neutron capture count rates to the presence of gas in experimental or computer-modeled data. Because this gas detection technique does not employ a ratio of gamma ray detector values, the measurement will be responsive to the subterranean formation even in a gas-filled borehole when the tool is eccentered.

The gas detection measurement $Gas_{ID}$ may be used to qualitatively identify gas by plotting the gas detection measurement $Gas_{ID}$ over depth in a well log. Gas zones may be identified qualitatively by the movement of the plotted curve from a shaly-sand baseline.

This curve may correctly describe the presence of gas in a near-wellbore formation with a large movement from the statistical shale baseline. This qualitative interpretation tool may be used to "flag" areas of the well-log to indicate a need for further studies before condemning the area as non-productive. In addition, this curve presentation may be another quick way for a production engineer to evaluate small or marginal shale-laminated gas zones that may otherwise be overlooked. The magnitude of the response curve of the gas detection measurement may reflect not only the presence of gas but also its density and pressure.

With the foregoing in mind, FIG. 1 illustrates a wellsite system in which the disclosed gas detection measurement system can be employed. The wellsite system of FIG. 1 may be onshore or offshore. In the wellsite system of FIG. 1, a borehole 11 may be formed in subsurface formations by rotary drilling using any suitable technique. A drill string 12 may be suspended within the borehole 11 and may have a bottom hole assembly (BHA) 100 that includes a drill bit 105 at its lower end. A surface system of the wellsite system of FIG. 1 may include a platform and derrick assembly 10 positioned over the borehole 11, the platform and derrick assembly 10 including a rotary table 16, kelly 17, hook 18 and rotary swivel 19. The drill string 12 may be rotated by the rotary table 16, energized by any suitable means, which engages the kelly 17 at the upper end of the drill string 12. The drill string 12 may be suspended from the hook 18, attached to a traveling block (not shown), through the kelly 17 and the rotary swivel 19, which permits rotation of the drill string 12 relative to the hook 18. A top drive system could alternatively be used, which may be a top drive system.

In the wellsite system of FIG. 1, the surface system may also include drilling fluid or mud 26 stored in a pit 27 formed at the well site. A pump 29 may deliver the drilling fluid 26 to the interior of the drill string 12 via a port in the swivel 19, causing the drilling fluid to flow downwardly through the drill string 12 as indicated by the directional arrow 8. The drilling fluid 26 may exit the drill string 12 via ports in the drill bit 105, and circulating upwardly through the annulus region between the outside of the drill string 12 and the wall of the borehole 11, as indicated by the directional arrows 9. In this manner, the drilling fluid 26 lubricates the drill bit 105 and carries formation cuttings up to the surface, as the fluid 26 is returned to the pit 27 for recirculation.

The bottom hole assembly 100 of the wellsite system of FIG. 1 may include a logging-while-drilling (LWD) module 120 and/or a measuring-while-drilling (MWD) module 130, a roto-steerable system and motor 150, and the drill bit 105. The LWD module 120 can be housed in a special LWD drill collar, and can contain one or more types of logging tools. It will also be understood that more than one LWD module can be employed, as generally represented at numeral 120A. As such, references to the LWD module 120 can alternatively mean a module at the position of 120A as well. The LWD module 120 may include capabilities for measuring, processing, and storing information, as well as for communicating with surface equipment. The LWD module 120 may be employed to obtain a gas detection measurement $Gas_{ID}$ curve to enable qualitative identification of gas zones largely irrespective of lithology and porosity, as will be discussed further below.

The MWD module 130 can also be housed in a special MWD drill collar, and can contain one or more devices for measuring characteristics of the drill string and drill bit. It should be appreciated that more than one MWD module 130 can be employed, as generally represented at numeral 130A. As such, references to the MWD module 130 can alternatively mean a module at the position of 130A as well. The MWD module 130 may also include an apparatus for generating electrical power to the downhole system. Such an electrical generator may include, for example, a mud turbine generator powered by the flow of the drilling fluid, but other power and/or battery systems may be employed additionally or alternatively. In the wellsite system of FIG. 1, the MWD module 130 may include, for example, a weight-on-bit measuring device, a torque measuring device, a vibration measuring device, a shock measuring device, a stick slip measuring device, a direction measuring device, and/or an inclination measuring device.

Figure 2:
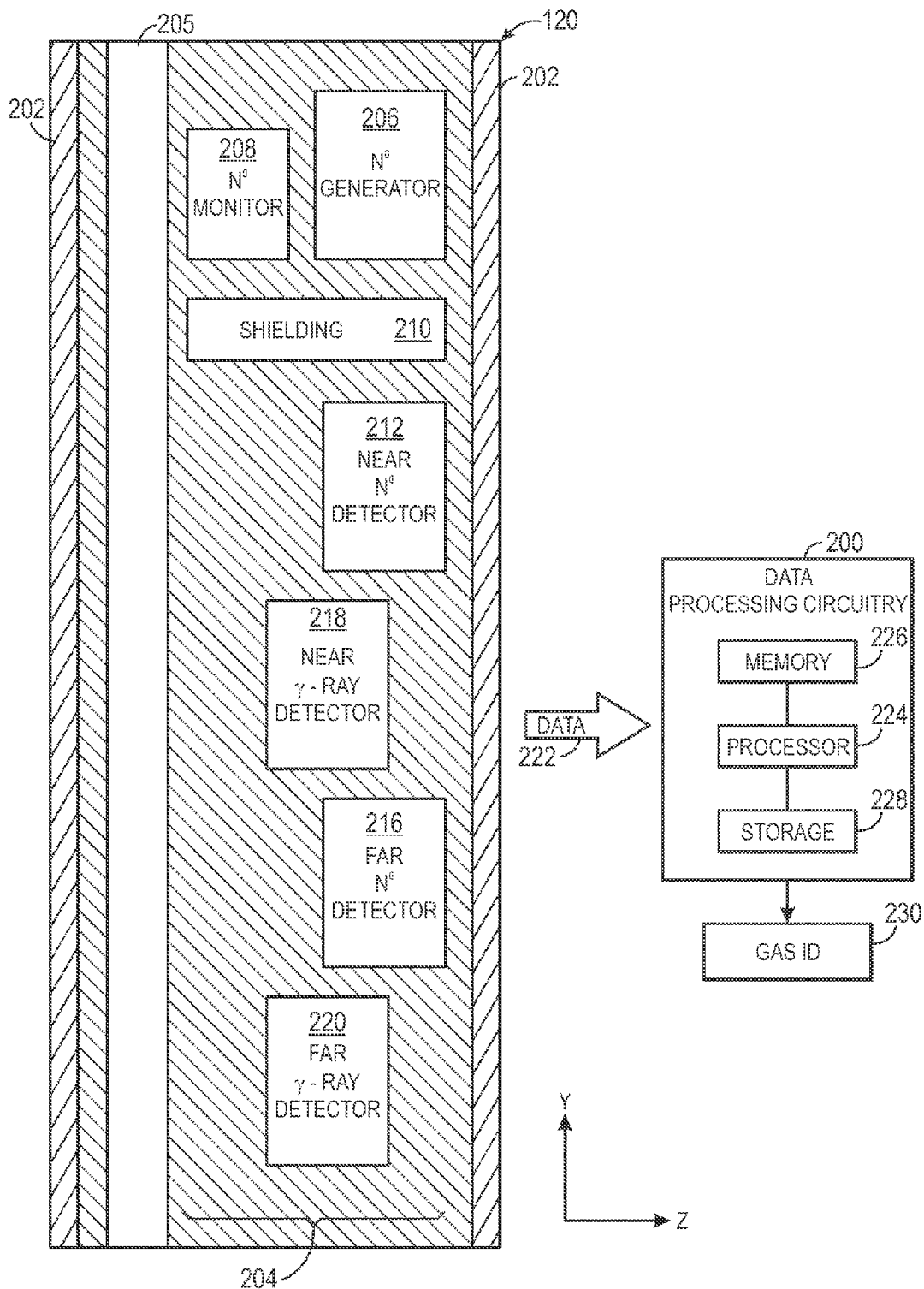
FIG. 2 is a block diagram representing a nuclear downhole system capable of obtaining a gas detection measurement for identifying gas zones irrespective of formation lithology or porosity, in accordance with an embodiment.

The LWD module 120, one example of which appears in FIG. 2, may be used in a system for obtaining a qualitative gas detection measurement $Gas_{ID}$ to identify gas zones irrespective of formation lithology or porosity. That is, using the LWD module 120 of FIG. 2, a gas detection measurement $Gas_{ID}$ can be determined and used to qualitatively identify gas zones in formations such as shale, sandstone, dolomite, and/or carbonate, for example, which might otherwise obscure the detection of gas. It should be understood that the LWD module 120 is intended to represent one example of a general configuration of a nuclear downhole tool that can be used to obtain the gas detection measurement $Gas_{ID}$, and that other suitable downhole tools may include more or fewer components and may be configured for other means of conveyance. Indeed, other embodiments employing the general configuration of the LWD module 120 are envisaged for use with any suitable means of conveyance, such as wireline, coiled tubing, logging while drilling (LWD), and so forth. As will be discussed below, however, the gas detection measurement $Gas_{ID}$ may best identify gas when used with logging-while-drilling (LWD) data, since LWD data is obtained before the formation may have been invaded by other materials (e.g., drilling mud or hydrocarbons) not originally present. In addition, the LWD module 120 of FIG. 2 may or may not include associated data processing circuitry 200. Indeed, although the LWD module 120 and the data processing circuitry 200 are depicted as independent elements in FIG. 2, the data processing circuitry 200 may be implemented entirely within the LWD module 120, at the surface remote from the LWD module 120, or partly within the LWD module 120 and partly at the surface. By way of example, the LWD module 120 may represent a model of the EcoScope™ tool by Schlumberger.

As shown in FIG. 2, the LWD module 120 may be contained within a drill collar 202 that encircles a chassis 204 and a mud channel 205. The chassis 204 may include a variety of components used for emitting and detecting radiation. For example, a neutron generator 206 may serve as a neutron source that emits neutrons of at least 2 MeV, which is believed to be approximately the minimum energy to create gamma rays through inelastic scattering with formation elements. By way of example, the neutron generator 206 may be an electronic neutron source, such as a Minitron™ by Schlumberger Technology Corporation, which may produce pulses of neutrons through deuteron-deuteron (d-D) and/or deuteron-triton (d-T) reactions. Thus, the neutron generator 206 may emit neutrons around 2 MeV or 14 MeV, for example. A neutron monitor 208 may monitor the neutron emissions from the neutron generator 206. By way of example, the neutron monitor 208 may be a plastic scintillator and photomultiplier that primarily detects unscattered neutrons directly emitted from the neutron generator 206, and thus may provide a count rate signal proportional to the neutron output rate from the rate of neutron output of the neutron generator 206. Neutron shielding 210, which may include lead, for example, may largely prevent neutrons from the neutron generator 206 from passing internally through the LWD module 120 toward various radiation-detecting components on the other side of the shielding 210.

As illustrated in FIG. 2, the LWD module 120 can include a near neutron detector 212 and a far neutron detector 216. By way of example, the near neutron detector 212 may be spaced approximately 10-14 in. from the neutron generator 206, and the far neutron detector 216 may be spaced approximately 18-28 in. from the neutron generator 206. A near gamma ray detector 218 (also sometimes referred to as a short spacing (SS) gamma ray detector) may be located between the near neutron detector 212 and the far neutron detector 216. A far gamma ray detector 220 (also sometimes referred to as a long spacing (LS) gamma ray detector) may be located beyond the far neutron detector 216. For example, the near gamma ray detector 218 may be spaced approximately 16-22 in. from the neutron generator 206, and the far gamma ray detector 220 may be spaced approximately 30-38 in. from the neutron generator 206. Alternative embodiments of the LWD module 120 may include more or fewer of such radiation detectors, but generally may include at least two gamma ray detectors and at least one neutron detector. The neutron detectors 212 and 216 may be any suitable neutron detectors, such as $^3$He neutron detectors. The neutron detectors 212 and 216 may detect primarily epithermal neutrons or primarily thermal neutrons (e.g., one or both of the neutron detectors 212 and 216 may or may not be surrounded by thermal neutron shielding depending on the energy of the neutrons to be detected).

The gamma ray detectors 218 and/or 220 may be scintillator detectors surrounded by neutron shielding. The neutron shielding may include, for example, $^6$Li, such as lithium carbonate ($Li_2CO_3$), which may substantially shield the gamma ray detectors 218 and/or 220 from thermal neutrons without producing thermal neutron capture gamma rays. As will be discussed below, gamma rays detectable by the gamma ray detectors 218 and 220 may be generated when the neutron generator 206 emits pulses of neutrons into a surrounding formation causing the generation of neutron capture gamma rays and inelastic gamma rays. Neutron capture gamma rays are often employed to determine the neutron capture cross section, or sigma, of the formation, which is frequently used to detect the presence of gas. However, some formations may contain materials such as shale, sandstone, dolomite, and/or carbonate, which may obscure the presence of gas zones according to conventional measurements. According to present techniques, a gas detection measurement $Gas_{ID}$ may be determined to qualitatively identify gas zones largely irrespective of lithology or porosity. The gas detection measurement $Gas_{ID}$ may be determined with a function taking as its variables not only the neutron capture gamma rays, but also the inelastic gamma rays. The gas detection measurement $Gas_{ID}$ may be used to "flag" areas that are likely to contain gas zones despite the presence of formation materials that cause conventional measurements to suggest otherwise.

To determine the gas detection measurement $Gas_{ID}$, the count rates of gamma rays from the gamma ray detectors 218 and/or 220 (and/or count rates of neutrons from the neutron detectors 212 and 216) may be received by the data processing circuitry 200 as data 222. The data processing circuitry 200 may receive the data 222 and perform certain processing to determine various measurements that can be used to determine properties of the surrounding formation. By way of example, the data processing circuitry 200 may include a processor 224, memory 226, and/or storage 228. The processor 224 may be operably coupled to the memory 226 and/or the storage 228 to carry out the presently disclosed techniques. The processor 224 and/or other data processing circuitry may carry out certain instructions executable by the processor 224, which may be stored using any suitable article of manufacture that includes one or more tangible, computer-readable media at least collectively storing these instructions. The article of manufacture may include, for example, the memory 226 and/or the nonvolatile storage 228, which may represent, for example, random-access memory, read-only memory, rewriteable flash memory, hard drives, and optical disks.

The LWD module 120 may transmit the data 222 to the data processing circuitry 200 via, for example, internal connections within the tool, a telemetry system communication uplink, and/or a communication cable. From within the LWD tool 120 and/or at the surface, the data processing circuitry 200 may determine a qualitative gas detection measurement $Gas_{ID}$ in a report 230. The report 230 may include many other measurements, and may represent a well log. Specifically, the qualitative gas detection measurement $Gas_{ID}$ may be plotted against depth in such a well log. By observing the shape of the resulting gas detection measurement $Gas_{ID}$ diagnostic curve, the data processing circuitry 200 and/or a production engineer may identify probable gas zones. A few specific examples of well logs that include a gas detection measurement $Gas_{ID}$ diagnostic curve are discussed further below with reference to FIGS. 7 and 8. The report 230 may be stored in memory or may be provided to an operator via one or more output devices, such as an electronic display.

Figure 3:
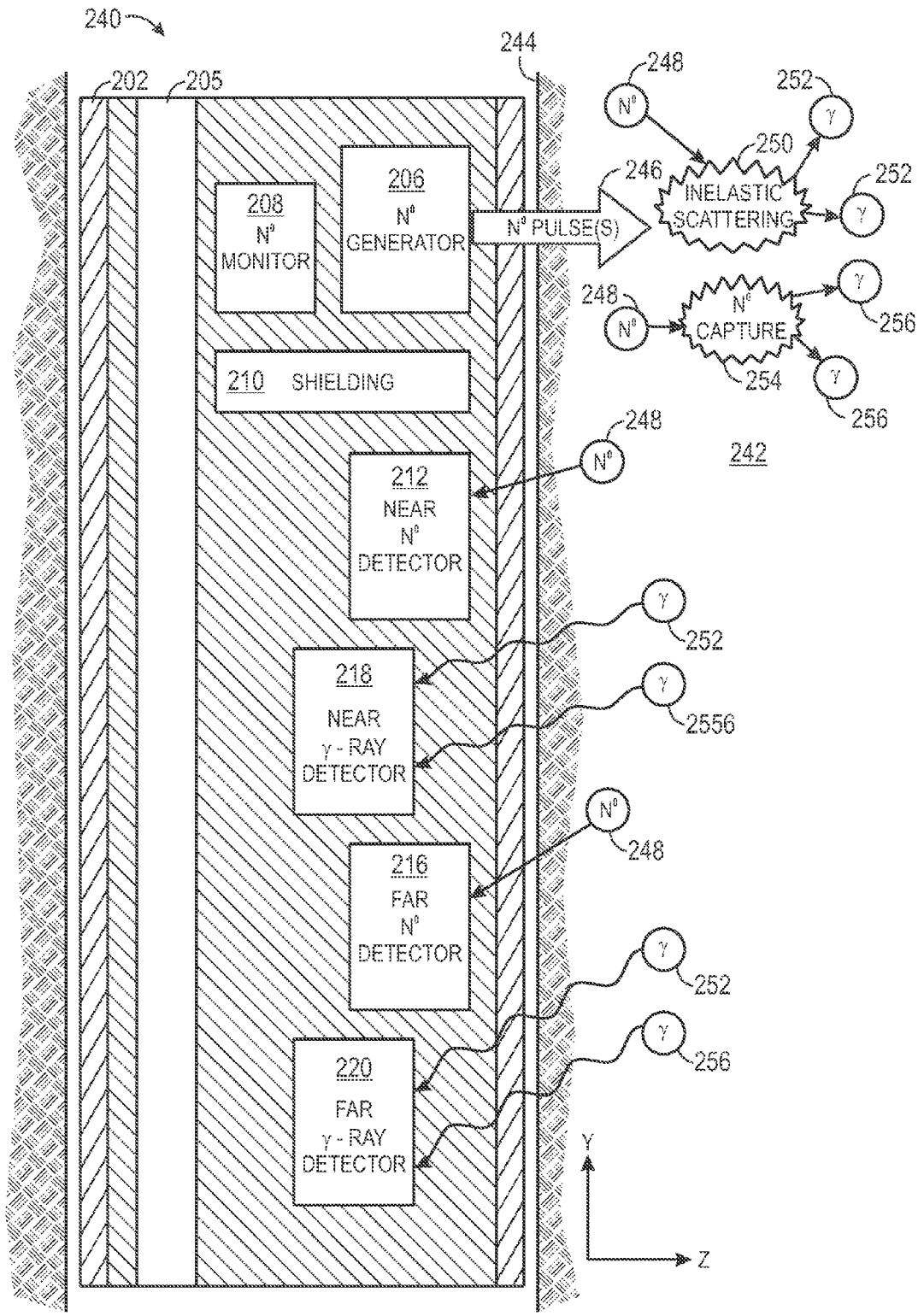
FIG. 3 is a schematic diagram representing a well-logging operation using the system of FIG. 2, in accordance with an embodiment.

The gamma ray measurements used to generate the gas detection measurement $Gas_{ID}$ may be collected during a well-logging operation. For example, as shown in a well-logging operation 240 of FIG. 3, the LWD module 120 may be used to obtain a gas detection measurement $Gas_{ID}$ that can be used to qualitatively identify gas zones in variety of formations 242, including shales, sandstone, dolomite, and/or carbonate, for example. As seen in FIG. 3, the well-logging operation 240 may involve lowering the LWD module 120 into the formation 242 through the borehole 11. In the example of FIG. 3, the LWD module 120 can be lowered into the borehole 11 while drilling, and thus no casing may be present in the borehole 11. However, in other embodiments, a casing may be present. It should be appreciated that when the gas detection measurement $Gas_{ID}$ is determined based on LWD data, the gas detection measurement $Gas_{ID}$ may be more likely to be accurately identify gas zones than otherwise.

In the well-logging operation 240, the neutron generator 206 may emit one or more pulses or bursts 246 of neutrons 248 out toward the formation 242. At the outset of each neutron pulse or burst 246, the fast neutrons 248 may interact with elements of the borehole and/or formation by way of inelastic scattering 250. Inelastic neutron scattering 250 occurs when fast, high-energy neutrons 248 interact with heavy nuclei in the formation 242 and borehole 11. During inelastic scattering 250, the high-energy neutron 248 imparts more of its kinetic energy to the struck nucleus than is predicted by a simple elastic collision. This inelastic collision excites the struck nucleus, raising it to one of its higher bound energy states. The excited nucleus will then normally return to its ground state by emitting one or more gamma rays 252. Because the gamma rays 252 originate from an inelastic scattering 250 event, these gamma rays 252 will be referred to as "inelastic gamma rays."

Generally, after the initial inelastic scattering 250 events, neutron capture 254 events may begin to dominate. Neutron capture 254 events occur by when a neutron 248 is "thermalized" to a lower-energy state in an element of the formation 242 or the borehole 11. Specifically, the neutron 248 will lose a substantial amount of energy through elastic scattering through elements of the formation 242 or borehole 11 after being emitted in the neutron pulse or burst 246. Eventually, the neutron 248 may have an energy level low enough to be absorbed in a collision with a denser element. As a result, a gamma ray 256 may be released from the host element. Because the gamma rays 256 originate from a neutron capture 254 events, these gamma rays 256 will be referred to as "neutron capture gamma rays."

The inelastic gamma rays 252 and neutron capture gamma rays 256 may be detected by the near and far gamma ray detectors 218 and 220. It should also be noted that, although not necessarily used for determining the gas detection measurement $Gas_{ID}$, the neutrons 248 that scatter in the borehole 11 and formation 242 and return to the LWD module 120 may be detected by the near neutron detector 212 and the far neutron detector 216. The inelastic gamma rays 252 and the neutron capture gamma rays 256 may be distinguished from one another based on the timing of the neutron pulse or burst 246. For example, as shown by a timing diagram 260 in FIG. 4, the occurrence of the pulse or burst 246 of neutrons 248 may begin a period T during which the inelastic gamma rays 252 and neutron capture gamma rays 256 are detected. By way of example, the period T may be between approximately 20-45 µs (e.g., 20 µs, 2 µs, 30 µs, 35 µs, 40 µs, or 45 µs, etc.).

Figure 4:
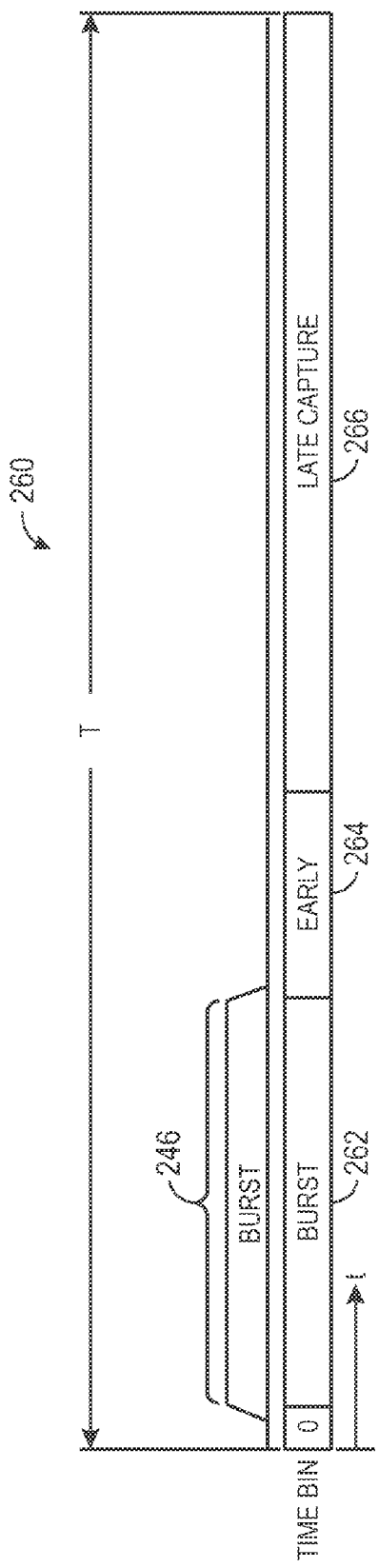
FIG. 4 is a timing diagram representing various time gates for emitting and detecting radiation using the system of FIG. 2, in accordance with an embodiment.

At the start of the timing diagram 260 of FIG. 4, the neutron pulse or burst 246 may take place over an initial burst gate 262. The burst gate 262 represents the amount of time during which the pulse or burst 246 of neutrons is occurring and may be relatively short. For example, the burst gate 262 may endure approximately 5-15 µs (e.g., 5 µs, 10 µs, or 15 µs, etc.). During the burst gate 262, the gamma rays detected by the near gamma ray detector 218 and far gamma ray detector 220 generally may be inelastic gamma rays 252 that arise due to inelastic scattering. In particular, it may be appreciated that the inelastic gamma ray population is a function of the neutron 248 "slowing down length" and density of the material through which the gamma rays 252 travel. The inelastic gamma ray 252 count rate response is therefore directly proportional to the number of high-energy neutron 248 collisions that occur generally during the burst gate 262. The number of these inelastic collisions increases considerably with decreases in hydrogen density in the borehole 11 and the formation 242. A decrease in hydrogen nuclei decreases the number of elastic energy-reducing collisions and allows more high-energy neutrons to come in contact with heavy borehole 11 and formation 242 nuclei.

Also, it may be noted that variations in liquid-filled porosity of the borehole 11 and the formation 242 can affect the hydrogen index, which can be used to indicate the presence of a gas zone in many formation 242 materials. The hydrogen index, which is a measurement often obtained based on the detection of the neutrons 248, increases as the density decreases, and vice versa. However, the inelastic gamma ray 252 count rate is relatively insensitive to changes in liquid-filled porosity. In porous rock, as the water is removed and replaced with gas, the hydrogen index decreases and the density decreases. This causes a net increase in the observed inelastic gamma ray 252 count rates. The sensitivity to gas-filled porosity decreases as the porosity decreases and/or the distance from the LWD tool 120 to the formation 242 increases. It should further be appreciated that the measurement of inelastic gamma rays 252 results in a very shallow depth of investigation (DOI), on the order of a few inches in some cases. As such, the inelastic gamma ray 252 measurement is thus much more sensitive to changes in the borehole 11 region than in the formation 242 when gas is present in the borehole 11, the inelastic gamma ray 252 measurement will show an anomalous, high reading.

Following the burst gate 262 is the early gate 264. The early gate 264 may be shorter in duration than the burst gate 262, and generally represents the span of time immediately following the end of the pulse or burst 246 of neutrons 248. By way of example, the early gate 264 may last approximately 3-10 µs (e.g., 3 µs, 4 µs, 5 µs, 6 µs, 7 µs, 8 µs, 9 µs, or 10 µs, etc.). During the early gate 264, the amount of inelastic scattering 250 events may decline precipitously, such that the number of inelastic gamma rays 252 produced declines accordingly. At the same time, the percentage of total gamma rays being generated due to neutron capture 254 events begins to rise.

By the time of the late capture gate 266, the vast majority of gamma rays detected by the near gamma ray detector 218 and far gamma ray detector 220 are neutron capture gamma rays 256 that arise due to neutron capture 254 events. Thus, in some embodiments, the gamma rays detected by the gamma ray detectors 218 and/or 220 during the burst gate 262 may be inferred to be inelastic gamma rays 252. The gamma rays detected by the gamma ray detectors 218 and/or 220 during the late capture gate 266 may be inferred to be neutron capture gamma rays 256. In other embodiments, the inelastic gamma rays 252 may be distinguished from the neutron capture gamma rays 256 using any other suitable technique.

The count rate of the neutrons 248, the inelastic gamma rays 252 and the neutron capture gamma rays 256 may be employed to determine many characteristics of the subterranean formation 242 other than the gas detection measurement gas detection measurement $Gas_{ID}$. To provide one brief example, neutron capture gamma rays 256 are frequently used to generate a log output curve called "sigma," which represents the "capture cross-section" of the formation 242. Typically, sigma is used to discriminate between hydrocarbon and saline water in the formation 242, since the chlorine in the saline water has a very large capture cross-section compared to hydrocarbon and reservoir rocks. The greater the total salt count (NaCl per 1,000 PPM) in the formation 242 waters, the quantitative description of the water saturation of the formation 242. It may be noted that the effects of water salinity, porosity, and shaliness on the measured parameter sigma (that is, the quantitative part of the water saturation solution) are similar to those on resistivity logs. Thus, the two are easily correlated. One simple interpretation model presumes that the sigma of the formation 242 is equal to the sum of the constitute sigma values weighted by the fractional volume occupied:

$$\Sigma_{log} = \Sigma_{ma}(1-\Phi_e-V_{sh}) + V_{sh}\Sigma_{sh} + \Phi_e S_w \Sigma_{wa} + \Phi_e(1-S_w) \Sigma_{hyd} \qquad (1),$$

where $\Sigma_{log}$ represents a sigma log value in capture units (cu), $\Sigma_{ma}$ represents a sigma matrix value in capture units (cu), $\Sigma_{sh}$ represents a sigma shale value in capture units (cu), $\Sigma_{wa}$ represents a sigma water apparent value in capture units (cu), and $\Sigma_{hyd}$ represents a sigma hydrocarbon value in capture units (cu). The variable $V_{sh}$ represents the percent volume due to shale, which may be obtained from gamma ray measurements using correlations (e.g., linear, Clavier, Stieber, Larionov, etc.), $S_w$ represents the percent of water saturation, and $\Phi_e$ represents the effective porosity of the formation 242 in porosity units (pu).

From Equation 1 above, it may be seen that the sigma log value $\Sigma_{log}$ can be used to calculate moveable water saturation $S_w$. Transformation of the functional volume model in Equation 1 yields the classic shaly sand model solution for moveable water saturation $S_w$:

$$S_w = \frac{(\Sigma_{log} - \Sigma_{ma}) - \Phi_e(\Sigma_{hyd} - \Sigma_{ma}) - V_{sh}(\Sigma_{sh} - \Sigma_{ma})}{\Phi_e(\Sigma_{wa} - \Sigma_{hyd})}, \qquad (2)$$

This quantitative solution for movable water saturation $S_w$ directly identifies the moveable water content of the effective porosity. It should also be appreciated that several factors may interfere with a simple measurement of the formation 242 sigma: borehole fluid, borehole hardware (e.g., a gravel pack), and diffusion effects. As such, the LWD module 120 may employ any suitable technique to characterize borehole effects, such as a two-component diffusion model. Such an approach separates the borehole 11 and formation 242 components of the neutron capture gamma ray 256 signals.

In certain types of formation 242 materials, such as shaly sand, sandstone, dolomite, and/or carbonate, the petrophysical characteristics of the formation 242 may defy the interpretive methods of traditional sigma measurements to identify gas in the formation 242. In fact, it is believed that many of the large reserves of gas and hydrocarbons in the Gulf of Mexico and elsewhere may have had many gas zones that might have been left behind. Specifically, it is believed that prospects that apparently looked qualitatively marginal, or even bad, due to the effects of excess shale might have been left behind. In some cases, the formation 242 may have been too laminated for the vertical resolution of the neutron capture gamma ray 256 measurement to be employed to define. Indeed, it is believed that a crossover of near gamma ray detector 218 to far gamma ray detector 220 count rate curves may have indicated opposite conditions (e.g., a neutron-density porosity curve crossover might have been indicative of gas, while the overlay of these curves indicated "fluid-filled" porosity on the respective logs). As a result, it is believed that these zones were often passed up indefinitely or, worse, condemned as non-productive.

Figure 5:
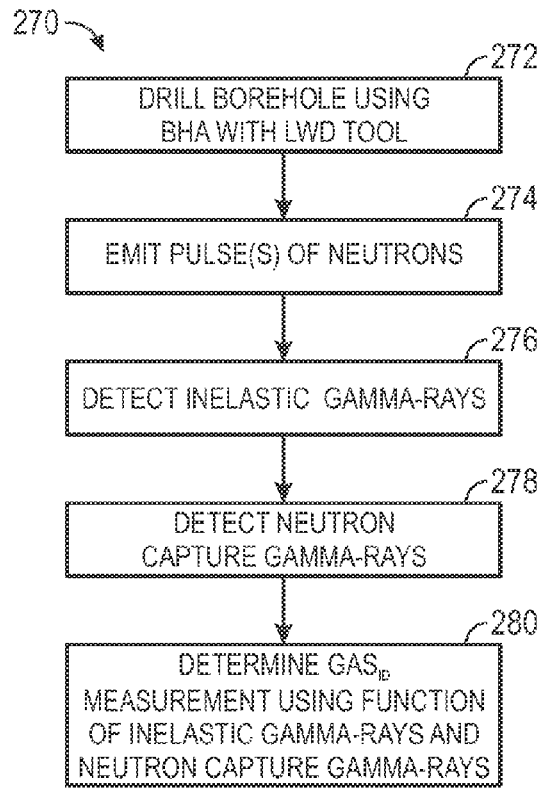
FIG. 5 is a flowchart describing a method for caring out the well-logging operation of FIG. 3, in accordance with an embodiment.

To better identify gas zones in materials such as shaly sand, sandstone, dolomite, and/or carbonate, the LWD module 120 may be employed to determine a qualitative gas detection measurement $Gas_{ID}$. The gas detection measurement $Gas_{ID}$ is a function of both the inelastic gamma rays 252 as well as neutron capture gamma rays 256. Specifically, as illustrated by a flowchart 270 of FIG. 5, the LWD tool 120 may be employed while the borehole 11 is being drilled (block 272) or, in alternative embodiments, be lowered into the borehole 11 using any suitable means of conveyance (e.g., wireline, coiled tubing, etc.). The neutron generator 206 may periodically emit pulses or bursts 246 of neutrons 248 (block 274). For example, the neutron generator 206 may emit a pulse or burst 246 in the manner discussed above with reference to the timing diagram 260 of FIG. 3.

The near gamma ray detector 218 or far gamma ray detector 220, or both, may detect the inelastic gamma rays 252 using any suitable technique (block 276). For example, the inelastic gamma rays 252 may be understood to be present primarily during a burst gate 262 (FIG. 3). Thus, the gamma rays detected by the near gamma ray detector 218 or far gamma ray detector 220, or both, during the burst gate 262 may be understood to be inelastic gamma rays 252.

The near gamma ray detector 218 or far gamma ray detector 220, or both, also may detect the neutron capture gamma rays 256 using any suitable technique (block 278). For example, the neutron capture gamma rays 252 may be understood to be present primarily during the late capture gate 266 (FIG. 3). Thus, the gamma rays detected by the near gamma ray detector 218 or far gamma ray detector 220, or both, during the late capture gate 266 may be understood to be neutron capture gamma rays 256.

Based on the detected count rate of inelastic gamma rays 252 and neutron capture gamma rays 256, a qualitative gas detection measurement $Gas_{ID}$ may be determined. This gas detection measurement $Gas_{ID}$ may not rely on any formation 242 salinity values for compensation interruption. Indeed, porosity and lithology changes can cause changes in a traditional PNC count rate ratio similar to those encounters in gas. However, using only the inelastic gamma rays and neutron capture gamma rays 256 as detected by the far gamma ray detector 220, the gas detection measurement $Gas_{ID}$ may be used to resolve the presence of gas in a manner that is not sensitive to lithology or porosity. The gas detection measurement may generally be described as according to the following relationship:

$$Gas_{ID} = f(\text{inelastic counts}, \text{neutron capture counts}) \qquad (3),$$

where the gas detection measurement $Gas_{ID}$ function $f$ may take any functional form (e.g., one or more polynomials) that relates, through characterization measurements and/or nuclear modeling, the inelastic gamma rays 252, the neutron capture gamma rays 256, and the presence of gas zones in a formation 242. Thus, when the gas detection measurement $Gas_{ID}$ function $f$ is a polynomial, the coefficients of such a function may be derived during the characterization of the LWD module 120 in various experimental and/or modeled settings. In addition, the gas detection measurement $Gas_{ID}$ function $f$ may be dependent on the neutron generator 206 strength, the sensitivity of the gamma ray detectors 218 and/or 220, and the environment of the borehole 11. Therefore, the calculation coefficients may be adaptable to the specific PNC tool being used and the borehole 11 environment. In some embodiments, the gas detection measurement $Gas_{ID}$ function $f$ may employ a fixed equation. In that case, the coefficients may be normalized for each well-logging operation 240. When the coefficients are normalized, the gas detection measurement $Gas_{ID}$ may be used to form a gas diagnostic curve with fixed scaling on a well log. Therefore, all curve scale parameters on the log will be the same, as opposed to sliding the ratio and varying the count rate scale presentations.

The gas detection measurement $Gas_{ID}$ may not employ a ratio of near-to-far gamma ray detectors 218 and 220 values, but rather may use only those gamma rays detected by the near gamma ray detector 218 or the far gamma ray detector 220. As such, the gas detection measurement $Gas_{ID}$ may be responsive to the formation 242 even in a gas-filled borehole 11 when the LWD tool 120 is eccentered. That is, gas in the borehole 11 will cause the results to read high. However, because the results can be normalized, along with gas-corrected porosity and sigma values, gas-filled formation 242 intervals can still be identified using the gas detection measurement $Gas_{ID}$.

Figure 6:
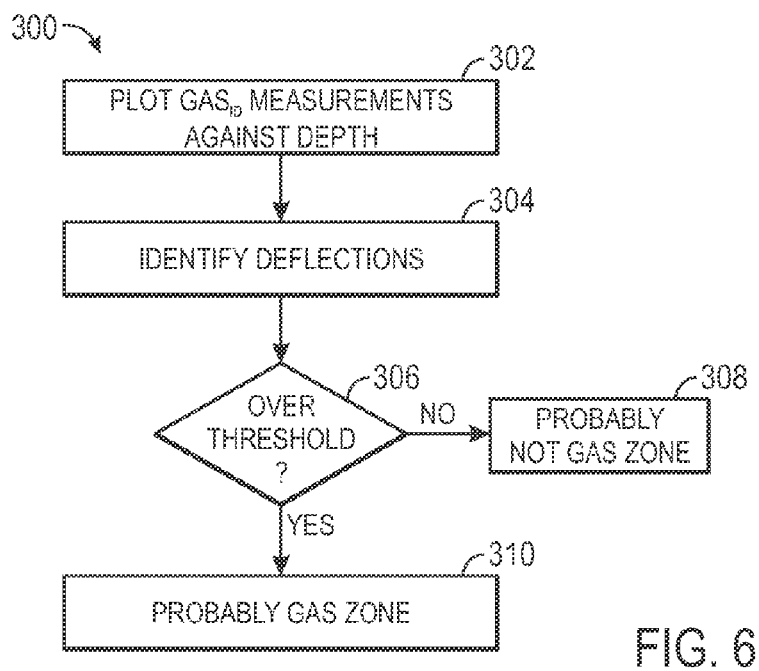
FIG. 6 is a flowchart describing an embodiment of a method for identifying gas zones irrespective of formation lithology or porosity, using the system of FIG. 2, in accordance with an embodiment.

As mentioned above, the gas detection measurement $Gas_{ID}$ can be used to qualitatively identify gas in the formation 242. For example, as shown by a flowchart 300 of FIG. 6, the various gas detection measurements $Gas_p$ detected at various depths throughout the formation 242 may be plotted in a log (block 302). The diagnostic curve that results describes gas presence in the formation 242 near the borehole 11 based on a large movement from a statistical shale baseline. Since qualitative interpretation tools are designed to "flag" areas that require further study before condemning them as non-productive, this curve presentation represents a quick way for a production engineer to evaluate small or marginal shale-laminated gas zones that might otherwise be overlooked.

As such, the data processing system 14 and/or a production engineer or operator may identify deflections in the plotted curve (block 304). If these deflections result in the gas detection measurement $Gas_{ID}$ remaining beneath a threshold (decision block 306), the zone in question is probably not a gas zone (block 308). On the other hand, if a deflection in the gas detection measurement $Gas_{ID}$ curve exceeds the threshold, the zone in question may be identified as a probable gas zone that warrants further investigation (block 310).

Figure 7:
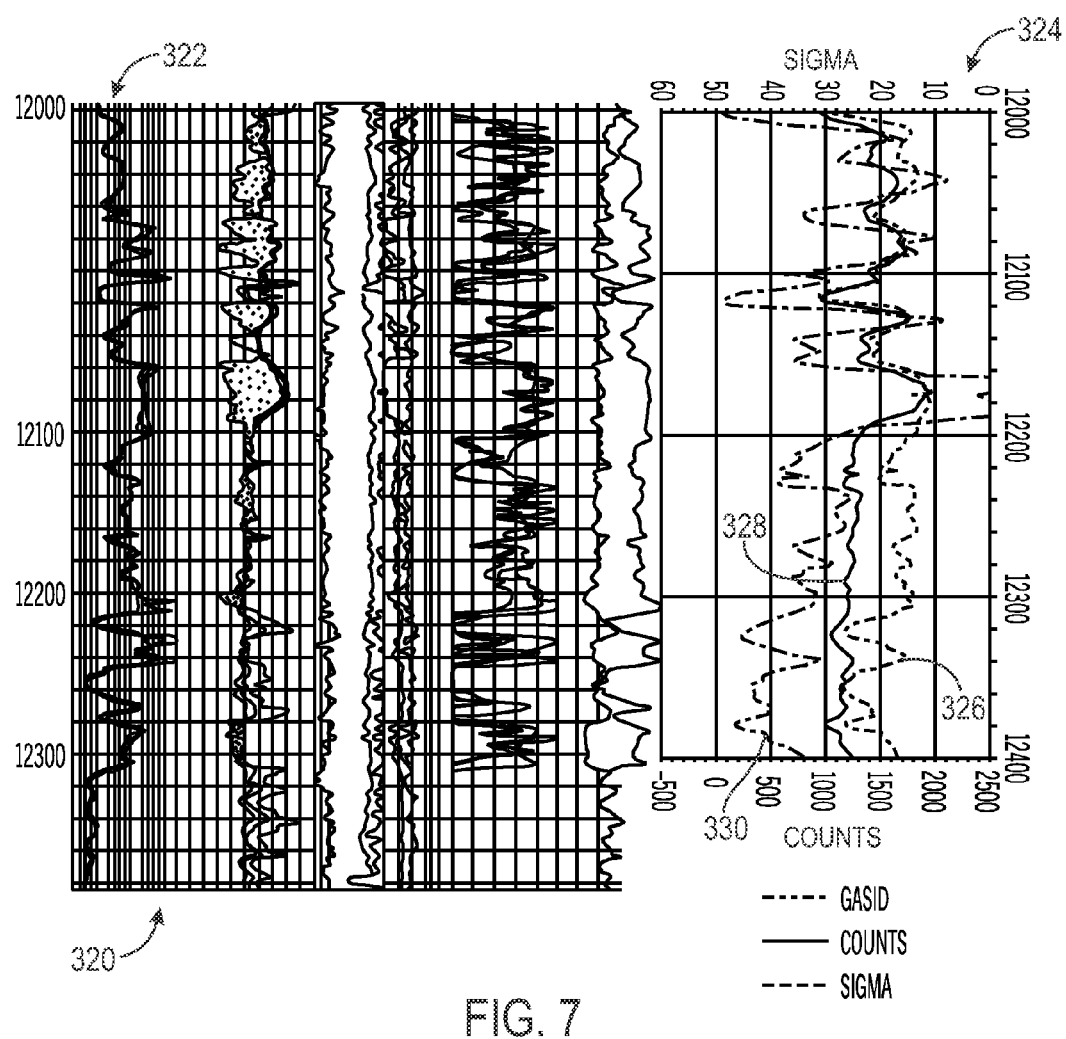
FIGS. 7 and 8 illustrate log data compared with a gas detection measurement obtained using the system of FIG. 2, representing examples of using the gas detection measurement to identify gas zones in formations with challenging lithologies, such as shales, in accordance with embodiments.
Figure 8:
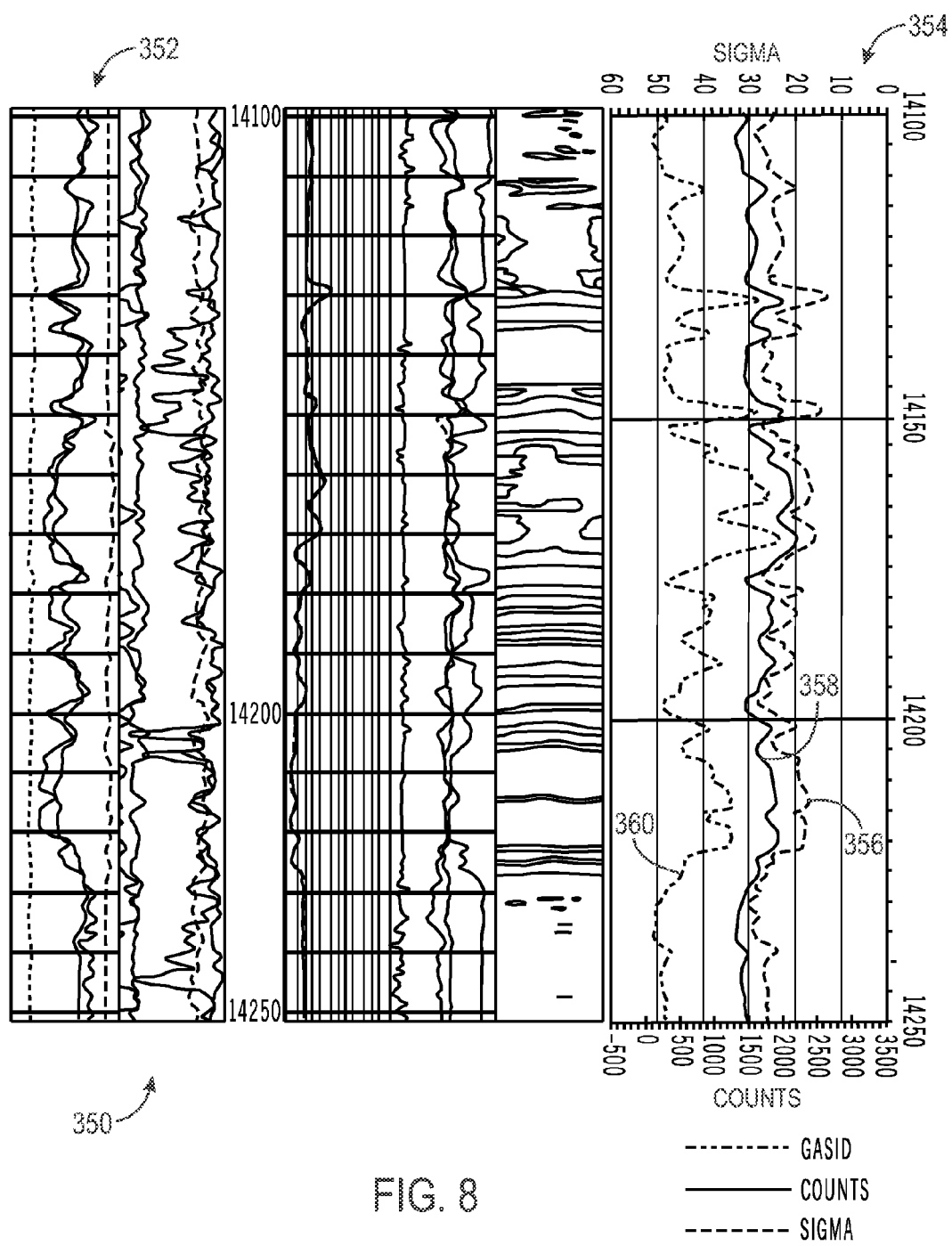

FIGS. 7 and 8 provide two specific examples that illustrate the use of the gas detection measurement $Gas_{ID}$ in shaly sand zones. As mentioned above, the appearance of a shaly sand zone in the formation 242 might otherwise obscure any gas zones located within them according to some conventional measurements. The examples of FIGS. 7 and 8 represent data obtained experimentally in the field, showing the manner in which the gas detection measurement $Gas_{ID}$ can be used qualitatively identify the presence of gas zones in shaly sand zones.

In a first example, FIG. 7 represents a logged interval 320 of a formation 242 of shaly sand with a known gas zone. The logged interval 320 shows measurements obtained from approximately 12050-12250 feet, and includes conventional log data 322 showing measurements for resistivity, neutron, and density porosity in a petrophysical analysis of the zone. Alongside the conventional log data 322 are qualitative curves 324. These qualitative curves 324 include a conventional sigma curve 326, a counts curve 328, and a gas detection measurement $Gas_{ID}$ diagnostic curve 330. The uppermost ordinate of the qualitative curves 324 represents sigma values associated with the sigma curve 326 and the lowermost ordinate represents total counts associated with the counts curve 328. The gas detection measurement $Gas_{ID}$ diagnostic curve 330 is unitless and normalized, and thus is shown alongside the sigma curve 326 and the counts curve 328.

As apparent in the logged interval 320, the zone between about 12050 and 12150 feet could simply be a low porosity and/or gas sand interval. The neutron openhole porosity data of the conventional log data 322 shows this interval to be a tight zone. On the other hand, the density openhole data of the conventional log data 322 indicates a higher porosity zone. The sigma curve 326 appears to show a decreased response in this zone and indicates that hydrocarbons are likely to be present. The porosity and sigma values are reduced by the formation 242 hydrocarbon/matrix responses. However, the gas detection measurement $Gas_{ID}$ diagnostic curve 330 clearly, and correctly, indicates a gas zone at 12050-12150 feet. A change in the gas detection measurement $Gas_{ID}$ curve 330 of over two divisions through this interval strongly confirms that this zone of the formation 242 is a gas sand. The variation in the gas detection measurement $Gas_{ID}$ diagnostic curve 330 also suggests a gas density effect (e.g., possibly a difference in the interval pressure). Thus, combining the conventional log data 322 with adjacent formation 242 gas detection measurement $Gas_{ID}$ responses may also provide an estimate of the interval pressure.

Likewise, in the zone below the 12150 foot interval, a possible gas formation interval is indicated by the openhole neutron-density response of the conventional log data 322. However, the gas detection measurement $Gas_{ID}$ diagnostic curve 330 suggests otherwise. The gas detection measurement $Gas_{ID}$ diagnostic curve 330 through this zone shows only negligible change. Therefore, the gas detection measurement $Gas_{ID}$ diagnostic curve 330 may be understood to identify, correctly, the absence of a gas zone in the zone below 12150 feet. In addition, it may be noted that the sigma curve 326 suggests a liquid hydrocarbon response in the zone below 12150 feet.

In another example, shown in FIG. 8, a logged interval 350 of a formation 242 provides data for an interval between 14100 feet and 14250 feet. FIG. 8 also illustrates conventional log data 352 and qualitative diagnostic curves 354. The conventional log data 352 includes, for example, resistivity, density, and neutron log data. The qualitative diagnostic curves 354 include a sigma curve 356, a counts curve 358, and a gas detection measurement $Gas_{ID}$ curve 360. The uppermost ordinate of the qualitative curves 354 represents sigma values associated with the sigma curve 356 and the lowermost ordinate represents total counts associated with the counts curve 358. The gas detection measurement $Gas_{ID}$ diagnostic curve 360 is unitless and normalized, and thus is shown alongside the sigma curve 356 and the counts curve 358.

As illustrated in the logged interval 350 of FIG. 8, the gas detection measurement $Gas_{ID}$ diagnostic curve 360 shows a moderate response at several known gas sand intervals between 14146-14172 feet, but has little or no response in the lower zones. The gas in the formation 242 causes the gas detection measurement $Gas_{ID}$ diagnostic curve 360 to increase over one division. The change in the gas detection measurement $Gas_{ID}$ diagnostic curve 360 suggests a liquid hydrocarbon below 14176 in probable water below 14222 feet (the gas detection measurement $Gas_{ID}$ diagnostic curve 360 response is negligible over these lower intervals). The qualitative indications by the gas detection measurement $Gas_{ID}$ diagnostic curve 360 confirms that the gas detection measurement $Gas_{ID}$ is not affected by the presence of liquids in the formation, but rather discretely identifies gas in the same depositional environment. The representation of the logged interval 350 in FIG. 8 also suggests at least a qualitative response to pressure and/or density of the hydrocarbons present in the formation 242.

Here, it should also be noted that the data obtained using conventional pulse neutron capture (PNC) logging measurements can be extended to the estimation of the gas pressure of the reservoir. Gas pressure is directly related to the hydrogen index volume in the matrix of the formation 242. With an estimate of the elemental volumes of the materials present in the formation 242 (e.g., rock matrix, shale, water, and gas), the sigma response can be correlated to hydrogen index using any suitable functional form. Accordingly, the sigma response can be correlated to the gas pressure using nuclear modeling (e.g., SNUPAR nuclear modeling). As noted above, the PNC shaly sand interruption technique used to determine water saturation provides estimates of this same information, if specific elemental data is not available from other sources such as openhole logs and core analysis.

To provide one brief example, wireline PNC data has been used to determine gas pressure. In particular, gas zones were detected in a shaly-sand interval with an average sigma of 17.7 cu. The water saturation was calculated to be about 35% in the interval. Based on the volumetric constitutions in this zone, the model indicated a hydrogen index of about 25, which translates to a gas pressure of about 7000 psia. The measured bottomhole pressure was 7040 psia. That is, the techniques of the present disclosure enable a fairly accurate estimation of the gas pressure in shaly sand zones. In addition, the same measurements can be used to estimate the density of a liquid within the formation 242 matrix using a similar approach. In particular, the water and oil saturation can be analyzed from the petrophysical and PNC-type data, and the oil density collated with the hydrogen index estimate.

Technical affects of the present disclosure include the identification of gas in difficult areas for gas zone identification, such as layer sand/shale environments and other similar materials (e.g., shale, sandstone, dolomite, and/or carbonate). In such environments, the presence of gas is believed to reduce the sigma and porosity values conventionally measured by PNC-type tools. However, the porosity can be decreased by inter-granular calcite cementation and/or shale content which appear to be similar in log response to a gas zone. As such, the gas detection measurement $Gas_{ID}$ formula can enable, among other things, distinguishing gas-filled formations from low-porosity formations in highly laminated, shaly sand environments. The gas detection measurement $Gas_{ID}$ can also be used with any PNC-type data set in real time or can be used to reprocess data in a playback mode to identify potential gas zones. Moreover, the gas detection measurement $Gas_{ID}$ can provide a qualitative indication of the gas density and pressure environment when combined with other conventional log data.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:
    emitting neutrons into a subterranean formation using a neutron generator to cause inelastic scattering events that generate inelastic gamma rays and neutron capture events that generate neutron capture gamma rays;
    detecting the inelastic gamma rays using a gamma ray detector;
    detecting the neutron capture gamma rays using the gamma ray detector; and
    determining, using data processing circuitry, a gas detection parameter ($Gas_{ID}$), wherein the gas detection parameter ($Gas_{ID}$) is a function of an-inelastic gamma rays count and of a neutron capture gamma rays count, and-is also based on experimental or modeled formation data, wherein a variation against depth of the gas detection parameter ($Gas_{ID}$) qualitatively indicates a gas zone when the gas zone is present in the subterranean formation irrespective of a lithology or a porosity of the subterranean formation.

2. The method of claim 1, wherein the neutrons are emitted into the subterranean formation, wherein the subterranean formation comprises a gas zone comprising a porosity in a range typically found in shaly sand.

3. The method of claim 1, wherein the neutrons are emitted into the subterranean formation, wherein the subterranean formation comprises a gas zone comprising shale, sandstone, dolomite, or carbonate, or a combination thereof.

4. The method of claim 1, comprising plotting, using the data processing circuitry, the gas detection parameter in a well log.

5. The method of claim 4, comprising identifying a deflection of the gas detection parameter at a location in the well log and flagging the location in the well log as a likely gas zone using the data processing circuitry when the deflection of the gas detection measurement exceeds a threshold.

6. The method of claim 1 wherein
    detecting the inelastic gamma rays and detecting the neutron capture gamma rays is performed using only the gamma ray detector.

7. A downhole tool comprising:
    an electronic neutron generator configured to emit a burst of neutrons into materials surrounding the downhole tool to cause inelastic scattering events that produce inelastic gamma rays and cause neutron capture events that produce neutron capture gamma rays;
    a gamma ray detector configured to detect the inelastic gamma rays and the neutron capture gamma rays that scatter in materials surrounding the downhole tool and return to the downhole tool; and
    data processing circuitry configured to determine a gas detection parameter ($Gas_{ID}$), wherein the gas detection parameter ($Gas_{ID}$) is a function of an-inelastic gamma ray count and of a neutron capture gamma ray count, wherein a variation against depth of the gas detection parameter provides a qualitative indication of the presence of a gas zone in a subterranean formation near the downhole tool.

8. The downhole tool of claim 7, wherein the gamma ray detector is configured to distinguish between the inelastic gamma rays and the neutron capture gamma rays by detecting the inelastic gamma rays while the electronic neutron generator is emitting the burst of neutrons and detecting the neutron capture gamma rays after the electronic neutron generator has emitted the burst of neutrons.

9. The downhole tool of claim 7, wherein the data processing circuitry is configured to determine the qualitative gas detection parameter using a polynomial function taking as its variables only the inelastic gamma rays and the neutron capture gamma rays detected by the gamma ray detector, such that no other gamma rays detected by any other gamma ray detector are variables of the polynomial function.

10. The downhole tool of claim 7, wherein the conventional measurement comprises a neutron porosity measurement.

11. The downhole tool of claim 7, wherein the data processing circuitry is located downhole and configured to determine the qualitative gas detection parameter substantially in real-time.

12. A system comprising:
    a downhole tool configured to emit neutrons into a subterranean formation and detect inelastic gamma rays and neutron capture gamma rays that result; and
    data processing circuitry configured to determine a plurality of gas detection parameter values, wherein the gas detection parameter is a function of an-inelastic gamma rays count and of a neutron capture gamma rays count, and is also based on experimental or modeled formation data wherein each of the values is determined at a predetermined depth wherein the data processing circuitry is configured to plot the plurality of gas detection parameter values as a gas detection diagnostic curve in a well log, wherein a deflection over a threshold in the diagnostic curve qualitatively identifies a gas zone present in the subterranean formation.

13. The system of claim 12, wherein the downhole tool comprises a near gamma ray detector and a far gamma ray detector and only the inelastic gamma rays and the neutron capture gamma rays detected by the far gamma ray detector are used by the data processing circuitry to determine the plurality of gas detection parameter values.

14. The system of claim 12, wherein the data processing circuitry is configured to identify the deflection in the well log and indicate that the gas zone is likely present when the deflection exceeds the threshold.

15. The system of claim 12, wherein the data processing circuitry is configured to plot the plurality of gas detection parameter values such that the gas detection measurement diagnostic curve has a fixed scaling on the well log.

16. The system of claim 12, wherein the data processing circuitry is configured to estimate a gas pressure of the subterranean formation based at least in part on a hydrogen index measurement from the downhole tool, a sigma measurement from the downhole tool, an estimate of elemental volumes of materials present in the subterranean formation, and a nuclear modeling technique.

17. The system of claim 12, wherein the data processing circuitry is located at a surface location and configured to determine the qualitative gas detection parameter values substantially in replay mode.

18. A method comprising:
emitting neutrons into a subterranean formation from a neutron generator to cause: 1) inelastic scattering events that generate inelastic gamma rays and 2) neutron capture events that generate neutron capture gamma rays;
detecting the inelastic gamma rays using a gamma ray detector;
detecting the neutron capture gamma rays using the gamma ray detector; and
plotting a gas detection parameter ($Gas_{ID}$) against depth, wherein each gas detection parameter (GasID) is a function based at least in part on a relationship between the of an-inelastic gamma rays count and of a neutron capture gamma rays count, and is also based on experimental or modeled formation data; and
qualitatively indicating presence of a gas zone based on one or more variation against depth of the plotted gas detection parameter (GasID).

19. The method of claim 18, wherein the neutrons are emitted into the subterranean formation, wherein the subterranean formation comprises a gas zone comprising a porosity in a range typically found in shaly sand.

20. The method of claim 18, wherein the neutrons are emitted into the subterranean formation, wherein the subterranean formation comprises a gas zone comprising shale, sandstone, dolomite, or carbonate, or a combination thereof.

21. The method of claim 18, comprising plotting the gas detection parameter in a well log.

22. The method of claim 18, comprising plotting the gas detection parameter in a downhole data processor.

23. The method of claim 18, comprising qualitatively indicating presence of a gas zone based on one or more deflections of the plotted gas detection parameter in substantially real-time.

24. The method of claim 18, comprising identifying the one or more deflections of the gas detection parameter at a location in a well log and flagging the location in the well log as a likely gas zone using the data processing circuitry when the deflection of the gas detection parameter exceeds a threshold.

* * * * *